UNITED STATES PATENT OFFICE.

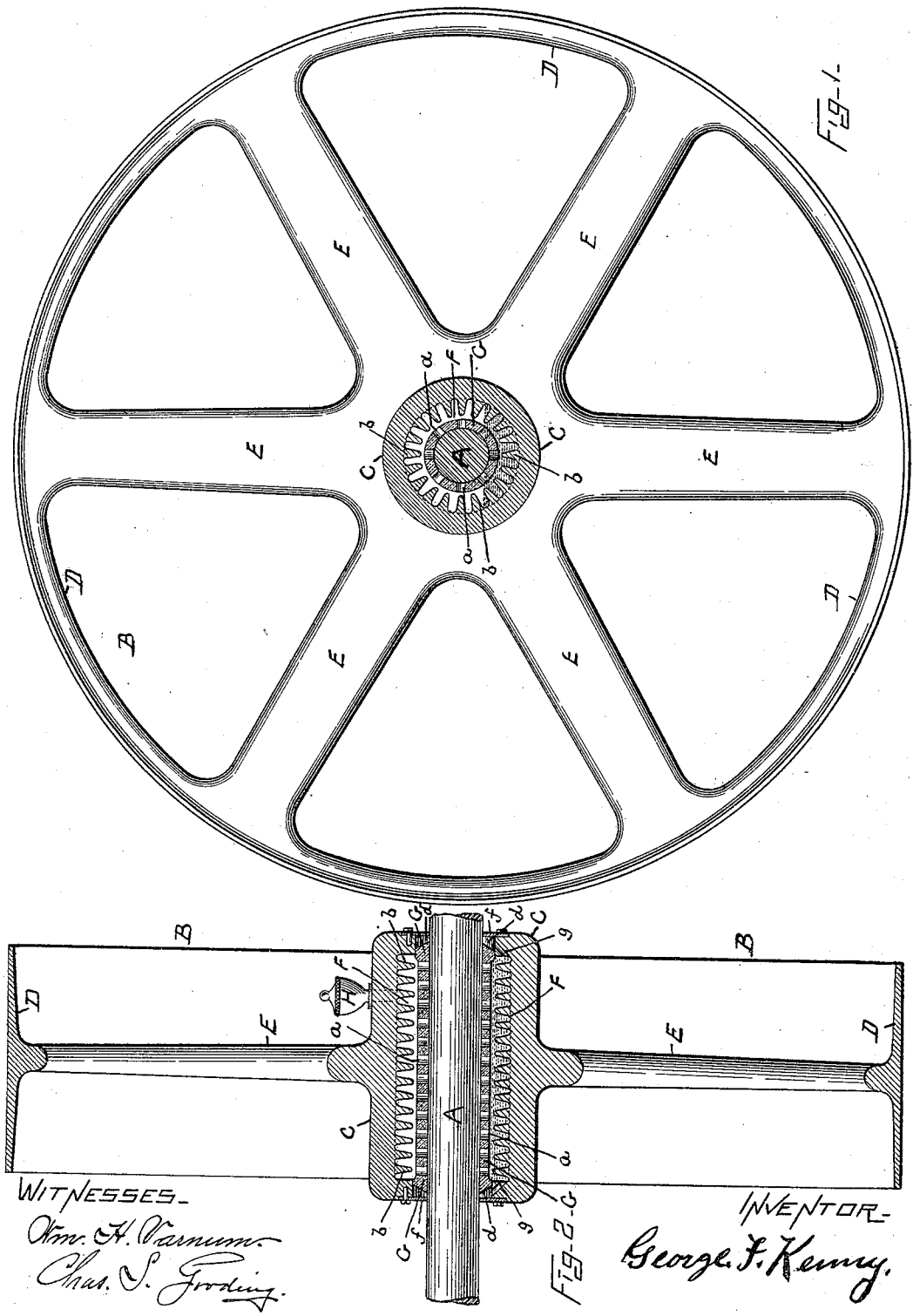

GEORGE F. KENNY, OF HYDE PARK, MASSACHUSETTS.

SELF-OILING LOOSE PULLEY.

SPECIFICATION forming part of Letters Patent No. 607,690, dated July 19, 1898.

Application filed December 15, 1897. Serial No. 662,060. (No model.)

*To all whom it may concern:*

Be it known that I, GEORGE F. KENNY, a citizen of the United States of America, and a resident of the town of Hyde Park, in the county of Norfolk and State of Massachusetts, have invented a certain new and Improved Self-Oiling Loose Pulley, of which the following is a full, clear, and exact description.

The object of this improvement in loose pulleys is to make them self-oiling; and to that end, under this invention, in substance, the hub of the pulley has a chamber for the oil or lubricant, which is about a sleeve or bushing that is fixed in the hub and is its bearing on the shaft and has passage through it for the oil in said chamber to run to the shaft, and said bearing and said chamber has, preferably, projections, which are in the form of teats, knobs, ribs, continuous or broken, or such like, and all so that with the pulley, after running, at rest, a dropping or showering of oil from off said projections in the then upper portion of said chamber of the pulley is secured and, falling upon said sleeve and thence passing to the shaft and bearing, oil them as desired.

Further, this invention consists of improvements in detail, all as hereinafter appear.

In the drawings forming part of this specification, Figure 1 is a side elevation of a loose pulley with its hub and shaft in vertical section. Fig. 2 is a transverse vertical section of the pulley, its hub and shaft.

In the drawings, A is a portion of a shaft. B is a loose pulley on said shaft. The pulley B has a hub C, a rim D, and spokes E, joining the hub and rim, and all, except as hereinafter stated, as usual.

F is a chamber within the hub and about a sleeve or bushing G, fixed in the hub and making its bearing on the shaft. The sleeve-bearing G of the pulley has a series of perforations $a$, making communications between said chamber F and the bore of the hub, or, in other words, the shaft and bearing and otherwise than this said chamber with its oil-cup or filler, as at H, closed, is closed at all parts within the hub.

$b\ b$ are knobs or teats about and projecting from the wall of the chamber toward the sleeve G. As particularly shown, these projections or teats are conical and arranged not only in parallel rows lengthwise of but also around said chamber; but, as will be obvious hereinafter, these projections may be of other shape and arrangements, and therefore it is not intended to limit the invention in that relation.

At each end of the sleeve G is a chamber $d$, which is closed by a cap-plate $f$ about the shaft and fixed to the hub, and $g\ g$ are passages leading from the chambers $d$ to the chamber F of the hub.

The pulley-hub through the filler at H is charged with oil on a level with the under side of the shaft, Fig. 1, and on the then running of the pulley the oil, as is self-evident, is thrown outward from the sleeve and disposed about said chamber. When arresting the running of the pulley, the greater portion of the oil at once returns to its normal position at the lower side of the shaft, but, as is plain, leaving some portions remaining on the projections $b$ then at the upper portion of the pulley-chamber to drop or shower from them onto the said sleeve, and thence to pass from it through its perforations onto the shaft, the result, as a whole, being a self-oiling of the bearing and shaft of the loose pulley.

The chamber $d$ at each end of the pulley-hub and the passages $g$ leading therefrom to the hub-chamber F prevent the oil from running out at the ends of the hub and secure its return to the hub-chamber, the advantages of which are obvious.

Having thus described my invention, what I claim, and desire to secure by Letters Patent, is—

A loose pulley having an oil-chamber formed in the hub thereof, a plurality of rows of concentrically-arranged conical teats formed integral with the inner wall of the hub and extending into the oil-chamber, said teats covering the entire inner surface of the hub, a perforated bearing-sleeve fixed within the hub and having its opposite ends cut away at an angle to provide an annular oil-space at such ends between the hub and sleeve, cap-plates secured to the opposite ends of the hub and forming the outer walls of the said oil-spaces, and passages in the hub leading
5 from the annular oil-spaces into the oil-chamber, substantially as described.

In testimony whereof I have hereunto set my hand in the presence of two subscribing witnesses.

GEORGE F. KENNY.

Witnesses:
ALBERT W. BROWN,
MARION E. BROWN.